US011920772B2

(12) United States Patent
Miller

(10) Patent No.: US 11,920,772 B2
(45) Date of Patent: Mar. 5, 2024

(54) MODULAR JUNCTION BOX FOR DOWNLIGHT LUMINAIRE

(71) Applicant: Hubbell Lighting, Inc., Shelton, CT (US)

(72) Inventor: Eric Stephen Miller, Simpsonville, SC (US)

(73) Assignee: HLI SOLUTIONS, INC., Greenville, SC (US)

( * ) Notice: Subject to any disclaimer, the term of this patent is extended or adjusted under 35 U.S.C. 154(b) by 0 days.

(21) Appl. No.: 18/084,004

(22) Filed: Dec. 19, 2022

(65) Prior Publication Data

US 2023/0194073 A1 Jun. 22, 2023

Related U.S. Application Data

(63) Continuation of application No. 17/371,655, filed on Jul. 9, 2021, now Pat. No. 11,530,805.

(60) Provisional application No. 63/050,454, filed on Jul. 10, 2020.

(51) Int. Cl.

| | |
|---|---|
| ***F21V 23/06*** | (2006.01) |
| ***F21S 8/02*** | (2006.01) |
| ***F21V 23/02*** | (2006.01) |

(52) U.S. Cl.
CPC .............. *F21V 23/06* (2013.01); *F21S 8/026* (2013.01); *F21V 23/023* (2013.01)

(58) Field of Classification Search
CPC ........ F21V 23/06; F21V 23/023; F21V 23/00; F21V 23/008; F21S 8/026; H02G 3/08; H02G 3/20; H02G 3/086
See application file for complete search history.

(56) References Cited

U.S. PATENT DOCUMENTS

| | | | | |
|---|---|---|---|---|
| 9,970,634 | B1 * | 5/2018 | Wronski | F21V 21/041 |
| 11,085,621 | B2 * | 8/2021 | Bowen | F21V 23/06 |
| 2002/0157847 | A1 * | 10/2002 | Chiriku | H02G 3/081 174/50 |
| 2015/0009675 | A1 * | 1/2015 | Wilcox | F21V 23/026 362/362 |
| 2017/0363261 | A1 * | 12/2017 | White | F21V 23/008 |

* cited by examiner

*Primary Examiner* — Peggy A Neils
(74) *Attorney, Agent, or Firm* — Buckley, Maschoff & Talwalkar LLC

(57) ABSTRACT

A universal junction box includes an upper body having a first connecting feature. A lower body releasably connects to the upper body having a second connecting feature configured to mate with the first connecting feature. The upper body and lower body forming a housing to receive an electrical connection. A first mounting feature is configured to selectively secure the housing to an associated frame or to an unassociated frame or other support structure.

8 Claims, 5 Drawing Sheets

MODULAR JUNCTION BOX FOR DOWNLIGHT LUMINAIRE

RELATED APPLICATION(S)

This application is a continuation of U.S. application Ser. No. 17/371,655, filed Jul. 9, 2021, now issued as U.S. Pat. No. 11,530,805, which is based on U.S. Provisional Application Ser. No. 63/050,454, filed Jul. 10, 2020, the disclosure of which are incorporated herein by reference in their entirety and to which priority is claimed.

FIELD

Various exemplary embodiments relate to indoor light fixtures, for example recessed downlights.

BACKGROUND

Recessed lighting fixtures or downlights provide lighting for a space, such as a building or room, and are aesthetically pleasing since the fixtures are advantageously recessed in the ceiling. Typically, these recessed downlights vary in structure depending on whether they are installed in new construction or in existing ceilings. Conventional downlights include a socket assembly electrically connected to a lamp, a trim or frame member, and hanger bars for mounting the light to a pair of joists in a ceiling or a suspended T-bar ceiling.

New construction downlight luminaires are typically positioned in a ceiling structure prior to installation of the ceiling. As such, replacement of the lighting fixture must be done from above the ceiling. Additionally, installation requires tools to secure the hanger bars to the joist supports and/or to secure the fixture to the ceiling. Installation in existing ceilings requires the removal of ceiling material and the installation and securement of individual components in the ceiling.

SUMMARY

According to an exemplary embodiment, a universal junction box includes an upper body having a first connecting feature. A lower body releasably connects to the upper body having a second connecting feature configured to mate with the first connecting feature. The upper body and lower body forming a housing to receive an electrical connection. A first mounting feature is configured to selectively secure the housing to an associated frame or to an unassociated frame or other support structure. The first mounting feature includes a foot extending from the lower body. The foot has an opening extending therethrough. The foot can be received in a projection of an associated frame or a fastener can extend through the opening to secure the junction box to a non-associated frame.

According to an exemplary embodiment, a downlight subassembly includes a junction having an upper body releasably connected to a lower body. The junction box has a first mounting feature. A power supply is connected to the junction box. The power supply includes one or more circuits configured to receive input power from a line voltage supply and modify the input power to an output power associated with a light emitter. An associated frame is configured to receive the junction box. The associated frame has a second mounting feature configured to mate with the first mounting feature. The junction box is configured to secure to the associated frame or to an unassociated frame.

According to another embodiment, a universal junction box includes an upper body having a first connecting feature, an upper wall, and an upper side wall. A lower body releasably connects to the upper body. The lower body has a second connecting feature configured to mate with the first connecting feature, a lower wall, and a lower side wall. A first mounting feature is configured to selectively secure the housing to an associated frame or to an unassociated frame or other support structure. The first connecting feature and the second connecting feature secure the upper body and lower body with a tool-less procedure.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION

The configuration of downlight fixtures are often based on whether they are installed in new construction or in existing ceilings or retrofit applications.

For new construction scenarios downlights can include two subassemblies ordered on independent line items and shipped to a jobsite at different times. The two subassemblies can include a housing subassembly and a trim subassembly. The housing subassembly can include a sheet metal frame or pan, bar hangers which attach to structural members, and an electrical junction box. The junction box includes a connection for a line voltage power supply. The housing subassembly is installed after ceiling members are in position, but before ceiling material is installed. For example, in a drop ceiling, the ceiling frame (e.g., a T-bar mounting frame) can be installed and the housing subassembly is connected to the ceiling frame prior to the ceiling panels. The trim subassembly can include light engine components, optical components, and any necessary heat sinking components. The light engine components can include a light source (e.g., LEDs, fluorescents, etc.) and control components (e.g., circuit boards, drivers, ballasts, etc.). The trim subassembly is installed from below the ceiling surface into the housing subassembly after ceiling surfaces are installed and, if necessary, finished (e.g., painted).

For retrofit scenarios the downlight includes two subassemblies that are both installed completely from below a finished ceiling surface. In lieu of a housing subassembly, a unique junction box with any necessary line voltage componentry is fed through a ceiling cutout and resides loosely in the ceiling. A low voltage line connects the junction box to a trim subassembly via a cable or flexible conduit. The trim subassembly is inserted into the ceiling cutout as a final step.

As described above, two unique junction box subassemblies are required for the two installation scenarios. For the new construction, the junction box components are integral or additions to a frame assembly. For the retrofit scenario, the junction box components are unique and different from that of the new construction scenario.

Figure 1:
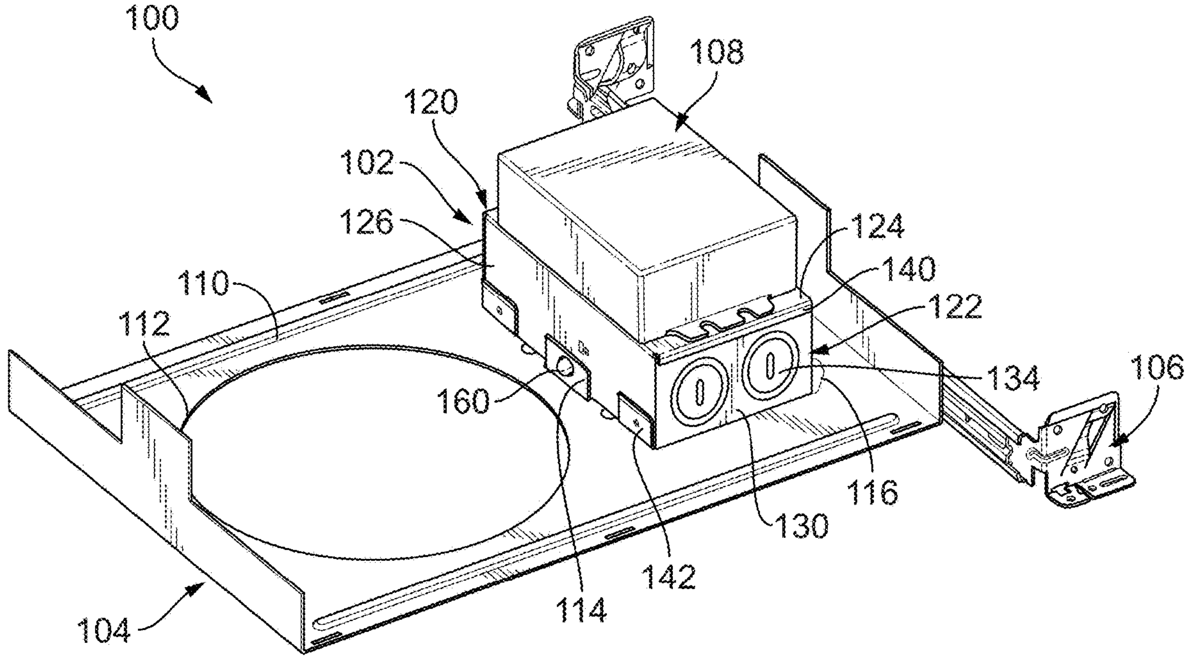
FIG. 1 is a perspective view of an exemplary light fixture subassembly.
Figure 2:
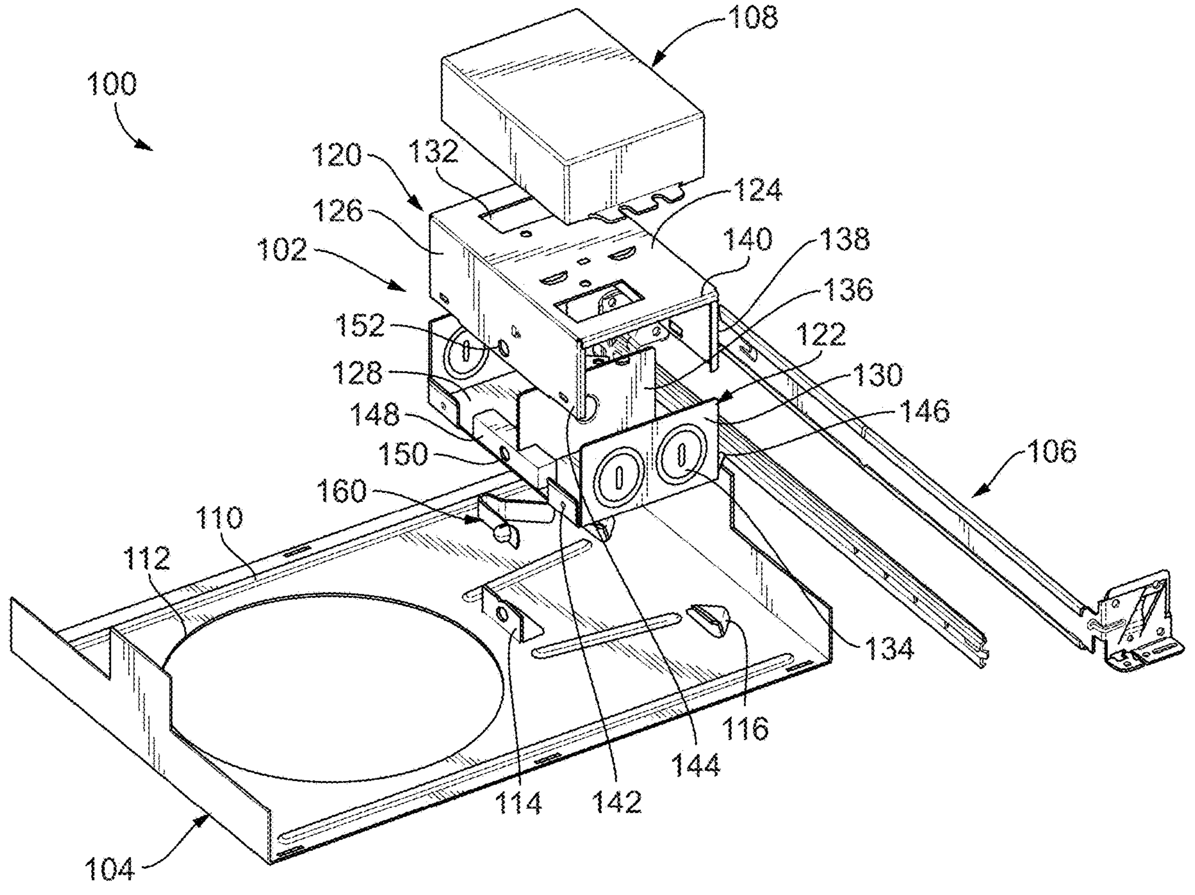
FIG. 2 is a perspective, exploded view of FIG. 1.
Figure 3:
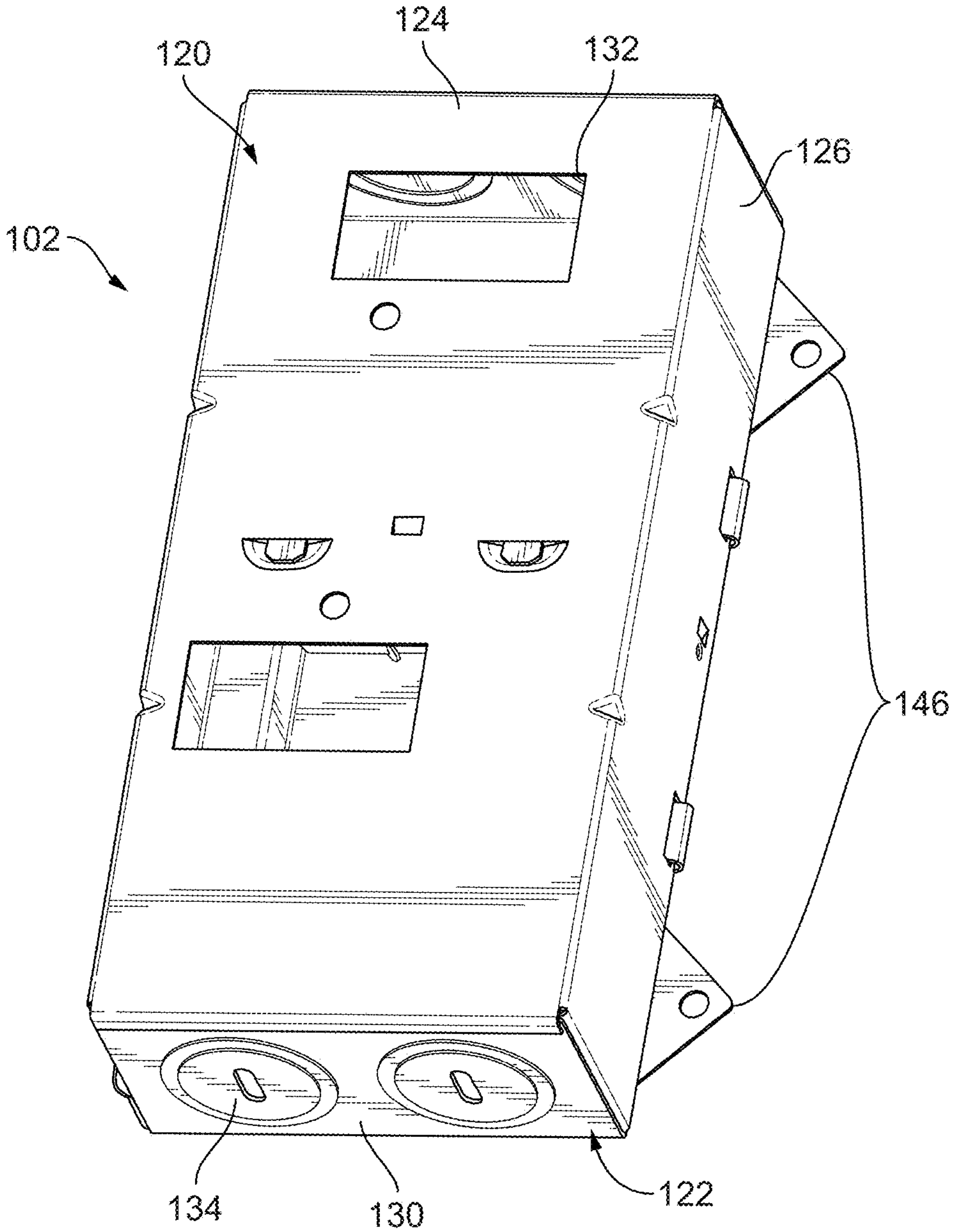
FIG. 3 is a perspective view of the junction box assembly of FIG. 1.

FIGS. 1-3 show a single downlight fixture subassembly 100 that includes a junction box 102 that can be used with either a new construction installation or a retrofit installation. The junction box 102 that can be attached and removed to a housing frame 104 for new construction scenarios, or can be fed through a ceiling cutout and reside loosely in a ceiling for retrofit scenarios. The junction box 102 can also be connected to an existing frame or other support in retro fit situations. Accordingly, the frame 104 can be considered an associated frame in that it is configured to specifically receive the junction box 102 and other frames not so specifically configured can be considered unassociated frames.

As shown in the illustrated exemplary embodiment of FIGS. 1-2, the light fixture subassembly 100 can include the junction box 102, the frame 104, hanger bars 106, and a power supply unit 108. The hanger bars 106 connect to the frame 104 to support the junction box 102, power supply 108, and a light emitter assembly (not shown) in a ceiling or other support structure.

The frame 104 includes a main body 110 having an opening 112 over which the light emitter is positioned to direct light to an area, such as a room. One or more mounting features are positioned on the frame 104 to position and retain the junction box 102 to the frame 104. In the illustrated embodiment, the mounting features include a front tab 114 extending from the main body 110 toward the junction box 102. The front tab 114 includes an opening that can be used to receive a fastener. The mounting features can also include a male or female mounting element with a corresponding element associated with the junction box 102. For example, rear slots or openings configured to receive a portion of the junction box 102. In the exemplary embodiment the rear slots are defined by triangular shaped projections 116 extending from the main body 110. Other configurations, including different shapes and sizes, can also be used. The mounting features can be unitary with the main body 110, for example formed through lancing or other stamping procedures. The mounting features can also be discretely formed and separately connected to the frame 104.

The junction box 102 can include an upper body 120 and a lower body 122 that combine to form a housing for one or more electrical connectors. The upper body 120 can include an upper wall 124 and a pair of upper side walls 126. The lower body 122 can include a lower wall 128 and a pair of lower side walls 130. The upper wall 124 can include openings 132 that can act as conduits for cables connected to the power supply unit 108. The lower side walls 130 can include knockouts 134 that are selectively opened to receive a line voltage supply. Different connectors or conductors can be included with and positioned in the junction box 102 depending on the associated type of light emitter.

As best shown in FIG. 2, a divider plate 136 can be positioned in the junction box 102. The divider plate 136 can be received in a slot formed in the lower body 122 and can extend between the lower body 122 and the upper body 120. A pair of tabs can extend from the top of the divider plate 136 that are received in slots formed in the upper wall 124 of the upper body 120. The divider plate 136 can be used to separate conductors and can create a low voltage compartment and a high voltage compartment in the junction box 102. One or more openings can be provided in the divider plate 136 to provide communication between the compartments. The divider plate 136 can be optionally included in certain installations.

The upper and lower bodies 120, 122 can include connection features that allow the parts to be mated together without separate hinges or other hardware. For example, the upper body 120 can include side flanges 138 that engage the lower side walls 130 and an upper flange 140 that receives an upper edge of the lower side walls 130. One or more cantilever tabs 142 can extend from the lower wall 128 toward the upper body 120. The tabs 142 can be resilient and can each include a projection. The upper side walls 126 can include indentations or slots 144 that receive the projections on the tabs 142 in a snap-fit or clip connection.

The junction box 102 also includes mounting features that allow it to be connected to the frame 104 or mounted to another frame or other support. For example, a pair of feet 146 can extend from one side of the junction box 102, as best shown in FIG. 3. The feet 146 can be configured to mate with the rear projections 116 provided on the frame 104. For example, the feet 146 can have a triangular configuration that mates with the triangular projections 116 on the frame 104. Other configurations, including different shapes and sizes, can also be used. One or more openings can be provided on the feet 146 that allow the junction box 102 to be secured to a different frame or other support in a ceiling. Accordingly, the junction box 102 can be supported without a frame 104, allowing it to be used in a variety of retrofit installations as well as in new construction installations.

The lower body 122 can also include a fastener housing 148 extending from the lower wall. The fastener housing 148 can include an internal cavity for receiving a fastener and a side opening 150. The upper side wall 126 can include a fastener opening 152 that is configured to align with the side opening 150. A fastener can extend through the openings to releasably secure the upper body 120 to the lower body 122. The fastener openings can also align with the opening on the tab 114 extending from the frame body 110 to secure the junction box 102 to the frame 104.

In an exemplary embodiment, the fastener can be a spring button fastener 160. The spring button 160 includes a resilient spring arm and a button extending outwardly from the arm. The spring button 160 can be positioned in the fastener housing 148 with the button extending through the side opening 150. The button can be depressed to allow the upper sidewall 126 to slide over the fastener housing 148 and to align the fastener opening 152 with the side opening 150. Once the openings 150, 152 are aligned, the arm will spring the button through the openings 150, 152. The spring button 160 can similarly be used to connect to the opening in the frame tab 114. Utilizing the spring button fastener 160 along with the other mounting components for the frame 104 and the connection features of the junction box 102 can lead to an entirely tool-less installation procedure.

The power supply unit 108 can be connected to the junction box 102. The power supply unit 108 includes an outer housing that contains one or more circuits to receive input power from a line voltage supply and alter or control the input power in a manner suitable for light emitter. For example, the input power can be converted from AC to DC, or the voltage can be adjusted (e.g., lowered) from a standard voltage. Other features such as current management and dimming can also be provided. The illustrated embodiment depicts the power supply unit 108 as a driver, but can also be a ballast or similar component. In certain applications the power supply unit is optional. The power supply unit 108 can also include, or provide power to, other control components associated with the downlight. These control components can include a battery backup unit, sensors (e.g., occupancy, motion, etc.), and communication components (e.g., radio, CAT5, etc.).

Figure 4:
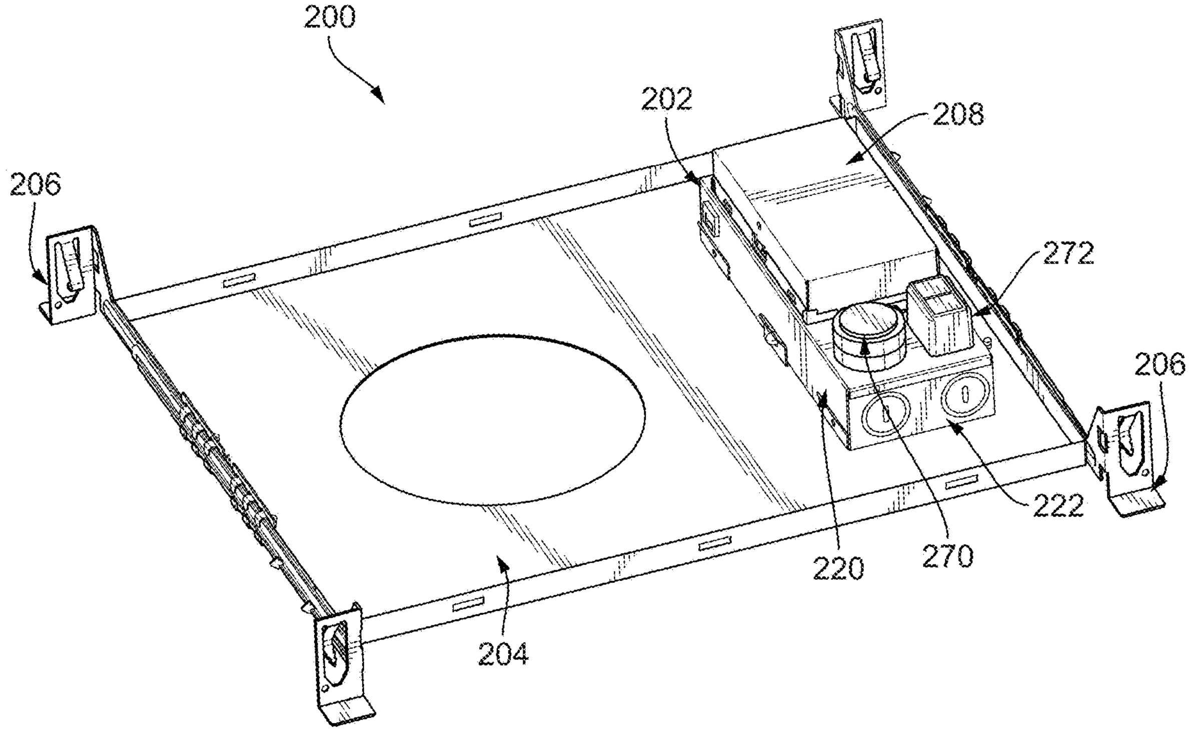
FIG. 4 is a perspective view of another exemplary light fixture subassembly.
Figure 5:
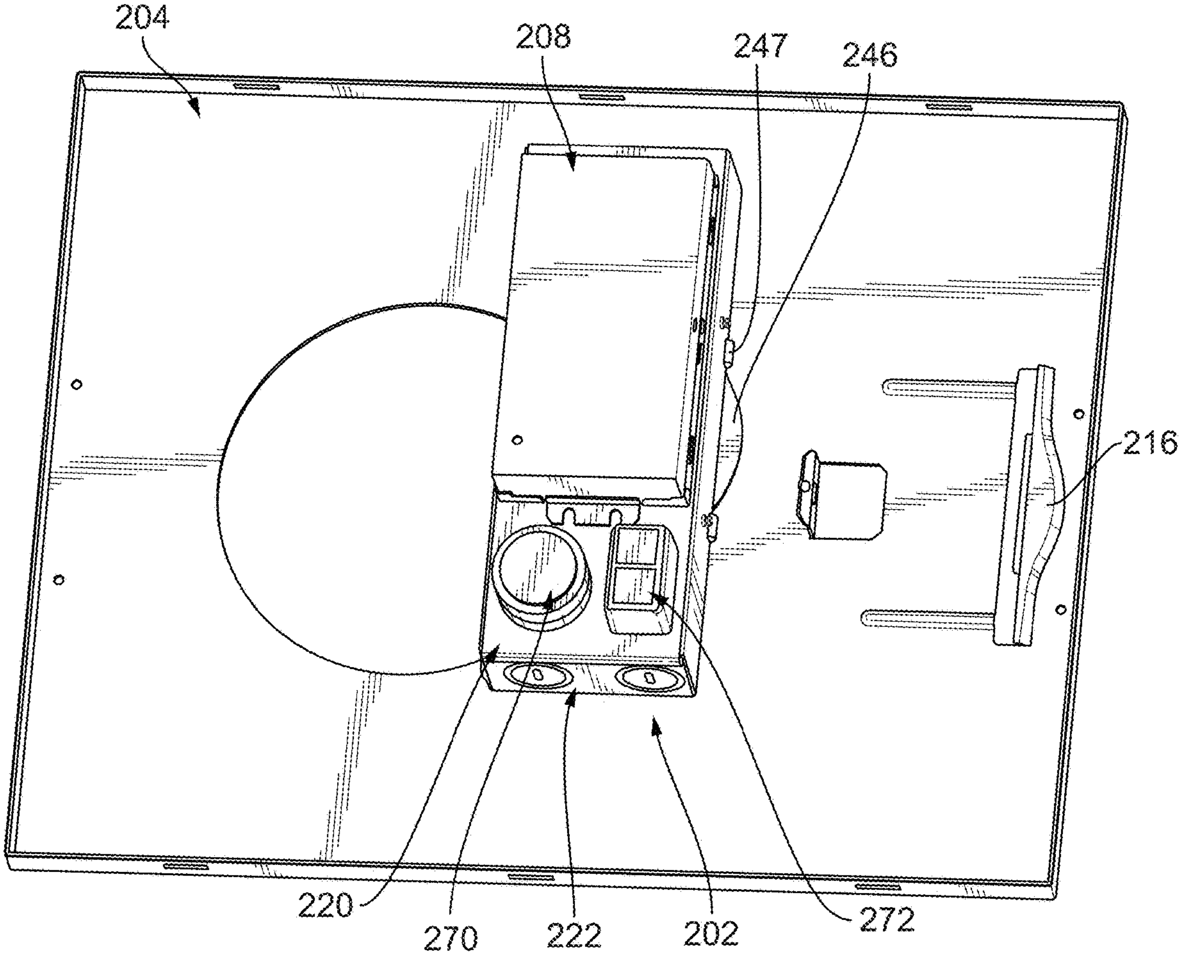
FIG. 5 is a perspective view of the junction box and the power supply unit of FIG. 4 separated from the frame.

FIGS. 4 and 5 show another exemplary embodiment of a downlight fixture subassembly 200 that includes a junction box 202 that can be used with either a new construction installation or a retrofit installation. The junction box 202 that can be attached and removed to a housing frame 204 for new construction scenarios, or can be fed through a ceiling cutout and reside loosely in a ceiling for retrofit scenarios. The junction box 202 can also be connected to an existing frame or other support in retro fit situations. Accordingly, the frame 204 can be considered an associated frame in that it is configured to specifically receive the junction box 202 and other frames not so specifically configured can be considered unassociated frames.

As shown in the illustrated exemplary embodiment of FIGS. 4 and 5, the light fixture subassembly 200 can include the junction box 202, the frame 204, hanger bars 206, and a power supply unit 208. The hanger bars 206 connect to the frame 204 to support the junction box 202, power supply 208, and a light emitter assembly (not shown) in a ceiling or other support structure.

The frame 204 includes a main body having an opening over which the light emitter is positioned to direct light to an area, such as a room. One or more mounting features are positioned on the frame 204 to position and retain the junction box 202 to the frame 204. In the illustrated embodiment, the mounting features include a front tab extending from the main body toward the junction box 202. The front tab includes an opening that can be used to receive a fastener. The mounting features can also include a male or female mounting element with a corresponding element associated with the junction box 202. The mounting features can also include one or more rear slots or openings configured to receive a portion of the junction box 202. In the exemplary embodiment the rear slot is defined by a projection 216 having a curved portion extending from the main body. Other configurations, including different shapes and sizes, can also be used. The mounting features can be unitary with the main body, for example formed through lancing or other stamping procedures. The mounting features can also be discretely formed and separately connected to the frame 204.

The junction box 202 can include an upper body 220 and a lower body 222 that combine to form a housing for one or more electrical connectors. The upper body 220 can include an upper wall and a pair of upper side walls. The lower body 222 can include a lower wall and a pair of lower side walls. The upper wall can include openings that can act as conduits for cables connected to the power supply unit 208. The lower side walls can include knockouts that are selectively opened to receive a line voltage supply. Different connectors or conductors can be included with and positioned in the junction box 202 depending on the associated type of light emitter.

The upper and lower bodies 220, 222 can include connection features that allow the parts to be mated together without separate hinges or other hardware. For example, the upper body 220 can include side flanges that engage the lower side walls and an upper flange that receives an upper edge of the lower side walls. One or more cantilever tabs can extend from the lower wall toward the upper body 220. The tabs can be resilient and can each include a projection. The upper side walls can include indentations or slots that receive the projections on the tabs in a snap-fit or clip connection.

The junction box 202 also includes mounting features that allow it to be connected to the frame 204 or mounted to another frame or other support. For example, a foot 246 can extend from one side of the junction box 202. The foot 246 can be configured to mate with the rear projection 216 provided on the frame 204. For example, the foot 246 can have a curved configuration that mates with the curved projection 216 on the frame 204. Other configurations, including different shapes and sizes, can also be used. The mounting features can also include one or more hooks 247 extending from the junction box 202 adjacent the foot 246. The hooks 247 can extend through an opening in the frame 204 and engage an edge defining a portion of the opening. Accordingly, the junction box 202 can be supported without a frame 204, allowing it to be used in a variety of retrofit installations as well as in new construction installations.

The lower body 222 can also include a fastener housing extending from the lower wall. The fastener housing can include an internal cavity for receiving a fastener and a side opening. The upper side wall can include a fastener opening that is configured to align with the side opening. A fastener can extend through the openings to releasably secure the upper body 220 to the lower body 222. The fastener openings can also align with the opening on the tab extending from the frame body to secure the junction box 202 to the frame 204. In an exemplary embodiment, the fastener can be a spring button fastener. Utilizing the spring button fastener along with the other mounting components for the frame 204 and the connection features of the junction box 102 can lead to an entirely tool-less installation procedure.

The power supply unit 208 can be connected to the junction box 202. The power supply unit 208 includes an outer housing that contains one or more circuits to receive input power from a line voltage supply and alter or control the input power in a manner suitable for light emitter. For example, the input power can be converted from AC to DC, or the voltage can be adjusted (e.g., lowered) from a standard voltage. Other features such as current management and dimming can also be provided. The illustrated embodiment depicts the power supply unit 208 as a driver, but can also be a ballast or similar component. In certain applications the power supply unit is optional. The power supply unit 208 can also include, or provide power to, other control components associated with the downlight. These control components can include a battery backup unit, sensors (e.g., occupancy, motion, etc.), and communication components (e.g., radio, CAT5, etc.).

FIGS. 4 and 5 show an exemplary assembly that includes a radio communication module 270 and a wired (e.g., CAT5) communication module 272. The communication modules 270, 272 are connected to the junction box 202 and can be wired to a connection in the junction box 202 and/or to the power supply unit 208. The communication modules 270, 272 can provide communication with a centralized control system and/or with other lighting units to send information and receive control signals. The received control signals can control an attached light fixture. In certain installations, only a single communication module will be used.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated.

This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. A universal junction box comprising:

an upper body having a first connecting feature, an upper wall, and an upper side wall;

a lower body releasably connected to the upper body to form a housing, the lower body having a second connecting feature and a lower wall, wherein the first connecting feature includes a first opening positioned on the upper side wall and the second connecting feature includes a second opening; and a mounting feature configured to selectively secure the housing to a support structure, wherein the mounting feature mates with the first connecting feature and the second connecting feature to releasably secure the upper body to the lower body with a tool-less procedure, and the support structure includes a third opening, and the mounting feature includes a fastener that extends through each of the first opening, the second opening, and the third opening to secure the upper body to the lower body, and to secure the junction box to the support structure.

2. The universal junction box of claim 1, wherein the mounting feature includes a fastener that extends through the first opening and the second opening to releasably secure the upper body to the lower body.

3. The universal junction box of claim 1, wherein the mounting feature includes a spring button fastener.

4. The universal junction box of claim 1, wherein the mounting feature includes a fastener with a resilient spring arm and a button extending outwardly from the resilient spring arm.

5. The universal junction box of claim 1, wherein the housing is alternatively secured to the support structure by the mounting feature, or the housing resides loosely in a ceiling and is not secured to any support structure.

6. A universal junction box comprising:

an upper body having a first connecting feature, an upper wall, and an upper side wall;

a lower body releasably connected to the upper body to form a housing, the lower body having a second connecting feature and a lower wall; and a mounting feature configured to selectively secure the housing to a support structure, wherein the mounting feature mates with the first connecting feature and the second connecting feature to releasably secure the upper body to the lower body with a tool-less procedure, wherein the lower body includes a fastener housing extending from the lower wall, the mounting feature receivable within the fastener housing, and wherein the second connecting feature is positioned on the fastener housing; and wherein the mounting feature includes a spring button having a resilient spring arm and a button.

7. The universal junction box of claim 6, wherein the second connecting feature includes a second opening, and wherein the button is biased to extend through the second opening by the resilient spring arm.

8. The universal junction box of claim 7, wherein the first connecting feature includes a first opening and the support structure includes a third opening; and wherein the spring button is biased to extend through the first opening and the second opening to secure the lower body to the upper body, and wherein when the junction box is connected to the support structure, the button extends through the third opening to secure the junction box to the support structure.

* * * * *